(12) United States Patent
Matesanz Gil et al.

(10) Patent No.: US 7,905,104 B2
(45) Date of Patent: Mar. 15, 2011

(54) CLIMATISATION SYSTEM FOR WIND TURBINES

(75) Inventors: Álvaro Matesanz Gil, Madrid (ES); Juan Jose Bonilla Andrino, Madrid (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 453 days.

(21) Appl. No.: 12/151,298

(22) Filed: May 6, 2008

(65) Prior Publication Data

US 2008/0290662 A1 Nov. 27, 2008

(30) Foreign Application Priority Data

May 25, 2007 (ES) .................................. 200701448

(51) Int. Cl.
 *F25D 23/12* (2006.01)
(52) U.S. Cl. ......................................... 62/259.1; 62/260
(58) Field of Classification Search ................. 62/259.1, 62/324.6, 285, 260, 310; 415/4.3, 4.5, 175, 415/177; 290/44, 55; 165/104.19, 104.22, 165/45; 60/641.1, 641.2; 310/54, 64
See application file for complete search history.

(56) References Cited

U.S. PATENT DOCUMENTS

| | | | | |
|---|---|---|---|---|
| 7,168,251 B1* | 1/2007 | Janssen | ........................ | 60/641.1 |
| 7,182,575 B2* | 2/2007 | Grabau | ............................. | 416/1 |
| 7,198,453 B2* | 4/2007 | Hall | ................................ | 415/4.3 |
| 7,218,012 B1* | 5/2007 | Edenfeld | ........................ | 290/44 |
| 7,230,348 B2* | 6/2007 | Poole | ............................. | 290/55 |
| 7,233,079 B1* | 6/2007 | Cooper | ........................... | 290/44 |
| 7,234,409 B2* | 6/2007 | Hansen | ......................... | 114/258 |
| 7,235,895 B2* | 6/2007 | Melius et al. | ................... | 290/55 |

* cited by examiner

*Primary Examiner* — Mohammad M Ali
(74) *Attorney, Agent, or Firm* — Ladas & Parry LLP

(57) ABSTRACT

A climatisation system for wind turbines which comprise: a first heat exchanger (10) in the nacelle (1) for exchanging heat with an element of the nacelle for which the temperature needs to be controlled; a second heat exchanger (20) outside the nacelle (1) for exchanging heat with a first exchange unit (21); a first section (12) of a climatisation circuit for: connecting the first heat exchanger (10) with the second heat exchanger (20); circulating a liquid coolant between the first heat exchanger (10) and the second heat exchanger (20); impulsion units (100) for circulating the liquid coolant on the first section (12) of the climatisation circuit; a shut off valve (200); and expansion tank (400); an expansion valve (300) between the first heat exchanger (10) and the second heat exchanger (20).

9 Claims, 1 Drawing Sheet

CLIMATISATION SYSTEM FOR WIND TURBINES

FIELD OF THE INVENTION

The invention refers to climatisation system for controlling the temperature of elements of a wind turbine's nacelle.

BACKGROUND OF THE INVENTION

There are various different refrigeration systems for wind turbines known in the field. The following documents are examples of these systems:

WO 00/68570 shows an offshore wind turbine which cools the nacelle by means of a liquid circulated through the tower, transferring the heat to the sea water.

WO 01/06121 and WO 2004/016945 show the use of air circuits for cooling the nacelle. The circuits may be open or closed, with the heat exchanger being the wall of the tower or a conventional ventilation system.

DESCRIPTION OF THE INVENTION

The invention shows a climatisation system (refrigeration or heating, if the cycle is inverted) for a nacelle. The system is particularly suitable for very aggressive environments: corrosive environments or those with a lot of sand, which require the nacelle to be sealed airtight. It can also be used on wind turbines that reach very high operating temperatures.

The system referred to in this invention does not take air from the outside to cool the elements contained in the nacelle; in fact, in this invention the nacelle is airtight. Refrigeration systems using air from the outside are not suitable for installations in which wind turbines are located in places where the ambient temperature is high and, as such, the temperature of the cold source is not sufficiently low.

On the other hand, using sea water as the cold source, in addition to the obvious need for the wind turbine being sited in the sea, also requires an installation that is fully adapted to the working conditions, in other words, that all of the installation's components which will be in contact with the sea water are made from the appropriate materials to ensure the acceptable operation and useful life of the installation. As we know, such materials increase the price of any element in which they are used. This problem is particularly accentuated if sea water is used as a liquid coolant, given that the installation components to be affected by the corrosive effects of the salt contained in the water will not only be the exchanger and the auxiliary equipment of the cold source, but all of the installation components through which the liquid coolant circulates: circuits, exchangers and others.

In this invention, heat exchangers are used for the refrigeration process. The system can cool the entire nacelle or just one element, for example the gearbox. It is an airtight system, meaning that a controlled atmosphere is maintained inside the nacelle, by means of the pressure inside the nacelle being kept higher that the pressure outside to ensure that there is no contamination from outside and that, at most, the protective atmosphere contained in the nacelle may leak to the outside.

The climatisation system may also include, or not, a liquid coolant which experiences a phase change. The liquid coolant may be water.

The invention includes an accumulation system where heat is exchanged with a foundation or even with the foundation of the wind turbine itself or with a tank of exchanger fluid, which may be water. This accumulator element can be a high-mass element in order to provide a high level of accumulation capacity.

By means of this accumulation system, even in places where the temperature during the day is high, heat is accumulated in a cold source below ambient temperature and, obviously, below the temperature of the element or elements to be cooled, which constitute the heat source and may reach temperatures of between 45-50° C. Thus, during the day, the heat is accumulated in the accumulator element, which may be a concrete foundation of 10×10 m in size and 2 m in height, located at a depth of 1 m, where the average temperature is stable, with that heat being evacuated to the outside during the night.

One aspect of the invention refers to a climatisation system for wind turbines which comprise:
  a nacelle;
  a foundation;
  a tower which connects the nacelle to the foundation;
characterised in that:
  the nacelle is airtight; one method of obtaining an airtight nacelle is to maintain a controlled atmosphere inside the nacelle, by means of the pressure inside the nacelle being kept higher that the pressure outside to ensure that there is no contamination from outside and that, at most, the protective atmosphere contained in the nacelle may leak to the outside.
  the climatisation system comprises:
    a first heat exchanger in the nacelle for exchanging heat with at least one element of the nacelle for which the temperature needs to be controlled;
    a second heat exchanger outside the nacelle for exchanging heat with a first means of exchange;
    a first section of a climatisation circuit for:
      connecting the first heat exchanger with the second heat exchanger;
      circulating a liquid coolant between the first heat exchanger and the second heat exchanger;
    impulsion units to circulate the liquid coolant on the first section of the climatisation circuit;
    an expansion tank to allow a controlled expansion of the coolant and prevent overpressures in the circuit;
    a storage tank with capacity to store sufficient liquid coolant to ensure that the impulsion devices have liquid coolant to circulate on the first section of the circuit;
    at least one shut off valve regulated to prevent water hammer, since this can be a serious problem on installations with conduits of a considerable length;
    a relief valve between the impulsion devices and the first heat exchanger for returning excess liquid to the storage tank.

BRIEF DESCRIPTION OF THE DRAWINGS

The FIGURE is a side view which shows the layout of a wind turbine according to this invention that is illustrative but not limitative.

DESCRIPTION OF A PREFERRED EMBODIMENT OF THE INVENTION

Figure 1:
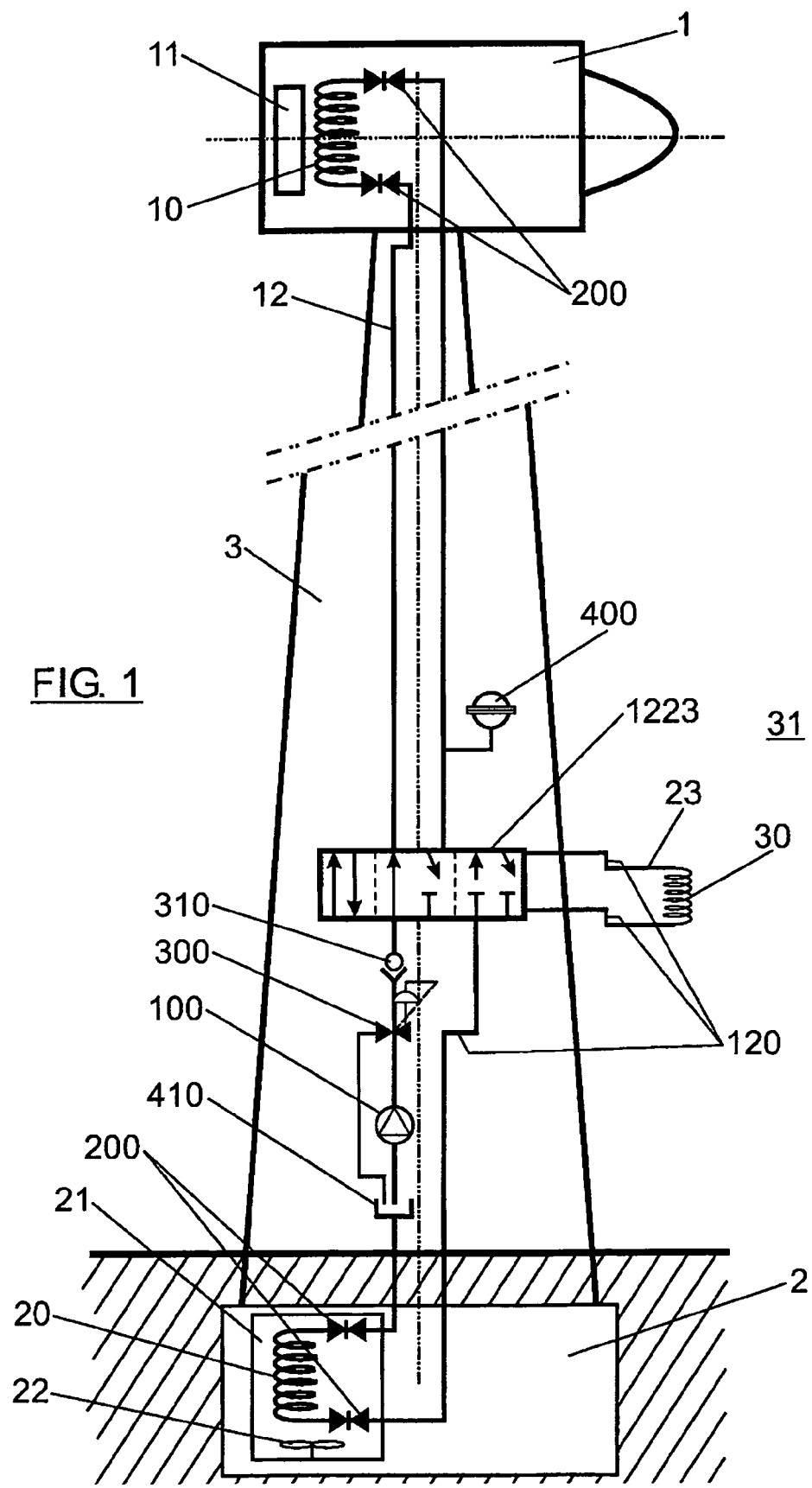

One configuration of this invention refers to a climatisation system for wind turbines which comprise:
  a nacelle (1);
  a foundation (2);

a tower (3) which connects the nacelle (1) to the foundation (2);

characterised in that:

the nacelle (1) is airtight; one method of obtaining an airtight nacelle is to maintain a controlled atmosphere inside the nacelle (1), by means of the pressure inside the nacelle (1) being kept higher than the pressure outside to ensure that there is no contamination from outside and that, at most, the protective atmosphere contained in the nacelle may leak to the outside.

the climatisation system comprises:

a first heat exchanger (10) in the nacelle (1) for exchanging heat with at least one element (11) of the nacelle for which the temperature needs to be controlled;

a second heat exchanger (20) outside the nacelle (1) for exchanging heat with a first means of exchange (21);

a first section (12) of a climatisation circuit, equipped with elbow connections (120) to absorb any dilation in the conduits comprising the circuit, for:

connecting the first heat exchanger (10) with the second heat exchanger (20);

circulating a liquid coolant between the first heat exchanger (10) and the second heat exchanger (20);

impulsion devices (100) to circulate the liquid coolant on the first section (12) of the climatisation circuit;

an expansion tank (400) to allow a controlled expansion of the liquid coolant and prevent overpressures in the circuit;

a storage tank (410) with capacity to store sufficient liquid coolant in order to ensure that the impulsion devices (100) have liquid coolant to circulate on the first section (12) of the circuit;

at least one shut off valve (200) regulated to prevent water hammer;

a relief valve (300) between the impulsion devices (100) and the first heat exchanger (10) to return any excess liquid to the storage tank (410).

Anti-return valves (310) may also be included in the climatisation system.

The climatisation system may also comprise:

a third heat exchanger (30) located outside the nacelle (1) for exchanging heat with a second means of exchange (31);

a second section (23) of a climatisation circuit, equipped with elbow connections (120) to absorb any dilation in the conduits comprising the circuit, for:

connecting the second heat exchanger (20) with the third heat exchanger (30);

circulating a liquid coolant between the second heat exchanger (20) and the third heat exchanger (30);

switching devices (1223) to switch the circuit between the first section (12) and the second section (23).

In this climatisation system, the first means of exchange (21) may include an exchange liquid to facilitate the exchange of heat between the second heat exchanger (20) and the means of exchange (21). In addition, in order to improve heat exchange between the second heat exchanger (20) and the first means of exchange (21), the climatisation system may also include an agitator (22) to move the exchange liquid and increase the convection coefficient.

The first means of exchange (21) may be the foundation (2). In this case, the second heat exchanger (20) could be a coil embedded in the foundation (2).

The second means of heat exchange (31) of the climatisation system of this invention could be the air outside, at the wind turbine location.

Moreover, the third heat exchanger of the climatisation system (30) could be located in an area outside the tower (3).

In relation to the liquid coolant used, this may be a fluid which experiences a phase change. Using a liquid with a phase change increases the heat transference to the means of heat exchange on which the liquid experiences a phase change.

As an additional option, the climatisation circuit may comprise at least one portion with a double wall pipe. This double wall pipe is particularly interesting for cases where a heat exchanger is embedded in a component of the wind turbine where the liquid coolant cannot be allowed to affect the component in the case of a breakage on the exchanger. The climatisation system may also include detection devices to detect any breakage of an internal wall of the double wall pipe.

The invention claimed is:

1. A climatisation system for wind turbines which comprise:

a nacelle (1);

a foundation (2);

a tower (3) which connects the nacelle (1) to the foundation (2);

characterised in that:

the nacelle (1) is airtight;

the climatisation system comprises:

a first heat exchanger (10) in the nacelle (1) for exchanging heat with at least one element (11) of the nacelle for which the temperature needs to be controlled;

a second heat exchanger (20) outside the nacelle (1) for exchanging heat with a first means of exchange (21);

a first section (12) of a climatisation circuit for:

connecting the first heat exchanger (10) with the second heat exchanger (20);

circulating a liquid coolant between the first heat exchanger (10) and the second heat exchanger (20);

impulsion devices (100) to circulate the liquid coolant on the first section (12) of the climatisation circuit;

an expansion tank (400) to allow a controlled expansion of the liquid coolant and prevent overpressures in the circuit;

a storage tank (410) with capacity to store sufficient liquid coolant in order to ensure that the impulsion devices (100) have liquid coolant to circulate on the first section (12) of the circuit;

at least one shut off valve (200) regulated to prevent water hammer;

a relief valve (300) between the impulsion devices (100) and the first heat exchanger (10) to return any excess liquid to the storage tank (410).

2. The climatisation system of claim 1, characterised in that it also comprises:

a third heat exchanger (30) located outside the nacelle (1) for exchanging heat with a second means of exchange (31);

a second section (23) of a climatisation circuit for:

connecting the second heat exchanger (20) with the third heat exchanger (30);

circulating a liquid coolant between the second heat exchanger (20) and the third heat exchanger (30);

switching devices (1223) to switch the circuit between the first section (12) and the second section (23).

3. The climatisation system of claim 1, characterised in that the first means of exchange (21) is the foundation (2).

4. The climatisation system of claim 3, characterised in that the second heat exchanger (20) is a coil embedded in the foundation (2).

5. The climatisation system of claim 2, characterised in that the second means of exchange (31) is the air outside, at the wind turbine location.

6. The climatisation system of claim 2, characterised in that the third heat exchanger (30) is located in an area outside the tower (3).

7. The climatisation system of claim 2, characterised in characterised in that the liquid coolant is a liquid which experiences a phase change.

8. The climatisation system of claim 1, characterised in characterised in that the climatisation circuit includes at least one portion which has a double wall pipe.

9. The climatisation system of claim 8, characterised in that it also includes detection devices to detect a breakage of the internal wall of the double wall pipe.

* * * * *